US012590606B2

(12) United States Patent

Iino et al.

(10) Patent No.: US 12,590,606 B2

(45) Date of Patent: Mar. 31, 2026

(54) ROLLING BEARING, ROTATION DEVICE, AND METHOD FOR MANUFACTURING ROLLING BEARING

(71) Applicant: Seiko Instruments Inc., Chiba (JP)

(72) Inventors: Akihiro Iino, Chiba (JP); Misato Hanaoka, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 97 days.

(21) Appl. No.: 18/355,911

(22) Filed: Jul. 20, 2023

(65) Prior Publication Data

US 2024/0035516 A1      Feb. 1, 2024

(30) Foreign Application Priority Data

Aug. 1, 2022    (JP) ................................. 2022-122799
Jun. 26, 2023    (JP) ................................. 2023-104286

(51) Int. Cl.
*F16C 33/66*          (2006.01)

(52) U.S. Cl.
CPC ...... *F16C 33/6614* (2013.01); *F16C 33/6633* (2013.01)

(58) Field of Classification Search
CPC .. F16C 33/66; F16C 33/6603; F16C 33/6607; F16C 33/6614; F16C 33/6618; F16C 33/6633; F16C 33/78; F16C 33/80; F16C 43/045; F16N 2210/14
See application file for complete search history.

(56) References Cited

U.S. PATENT DOCUMENTS

| | | | | |
|---|---|---|---|---|
| 5,915,844 | A | * | 6/1999 | Nanbu ................. C10M 177/00<br>508/552 |
| 2003/0015262 | A1 | * | 1/2003 | Takemura ............... F16C 33/62<br>148/663 |
| 2019/0375998 | A1 | * | 12/2019 | Tanaka ................. C10M 117/02 |

FOREIGN PATENT DOCUMENTS

| | | | | | |
|---|---|---|---|---|---|
| JP | | H112248 | A | * | 1/1999 ............ F16C 33/414 |
| JP | | 2002013541 | A | * | 1/2002 |
| JP | | 2017150615 | A | * | 8/2017 |
| WO | WO-2021060232 | A1 | * | 4/2021 .......... C10M 115/08 |

OTHER PUBLICATIONS

Machine Translation of WO-2021060232-A1 (Year: 2021).*
Machine Translation of JP-H112248-A (Year: 1999).*
Machine Translation of JP-2002013541-A (Year: 2002).*
Machine Translation of JP-2017150615-A (Year: 2017).*

* cited by examiner

*Primary Examiner* — Alan B Waits
(74) *Attorney, Agent, or Firm* — Crowell & Moring LLP

(57)          ABSTRACT

To provide a rolling bearing excellent in long-term durability. A rolling bearing includes: an inner ring and an outer ring disposed coaxially with each other; a rolling element disposed between the inner ring and the outer ring; a seal member mounted on the outer ring and configured to cover a space between the inner ring and the outer ring from an outside in an axial direction; and grease disposed between the rolling element and the seal member. The grease is in contact with an inner circumferential surface of the outer ring and the seal member. Unworked penetration of the grease is more than 178 and less than 287.

12 Claims, 4 Drawing Sheets

1

ROLLING BEARING, ROTATION DEVICE, AND METHOD FOR MANUFACTURING ROLLING BEARING

RELATED APPLICATIONS

This application claims priority to Japanese Patent Application Nos. 2022-122799 filed on Aug. 1, 2022 and 2023-104286 filed on Jun. 26, 2023 the entire contents of which are incorporated herein by reference.

BACKGROUND OF THE INVENTION

1. Field of the Invention

The present invention relates to a rolling bearing, a rotation device, and a method for manufacturing a rolling bearing.

2. Description of the Related Art

In the related art, there is a rolling bearing which holds grease between a pair of bearing rings (an inner ring and an outer ring). In this type of rolling bearing, resistance of the grease may cause an increase in rotational resistance. In a rolling bearing, a reduction in the rotational resistance is desired for the purpose of power-saving of a rotation device on which the rolling bearing is mounted. Particularly, in a small rolling bearing used in various motors such as a fan motor, there is a strong demand for the reduction in the rotational resistance.

In order to reduce the rotational resistance of the rolling bearing, it is effective to reduce an amount of grease which comes into contact with both members which rotate relative to each other. Therefore, grease is applied to an end portion of a fixed ring (an outer ring in many cases) of a rolling bearing in an axial direction or a seal member disposed on an end portion side to reduce an amount of grease which comes into contact with rolling elements (balls) and a retainer which holds the rolling elements (for example, see PTL 1). In the rolling bearing disclosed in PTL 1, grease adheres to an inner circumferential surface of an outer ring avoiding a raceway surface which is in contact with the rolling elements, and encloses in a circular ring shape and biased toward an inner circumferential surface side of an outer ring so as not to come into contact with an outer circumferential surface of an inner ring.

3. Citations

Patent Literature

PTL 1: JP2017-150615A

SUMMARY OF THE INVENTION

However, when the amount of grease which is in contact with the rolling elements and the retainer is reduced, supply of grease to a sliding portion becomes insufficient, which may lead to a decrease in long-term durability of the rolling bearing.

Accordingly, the invention provides a rolling bearing having excellent long-term durability, a rotation device, and a method for manufacturing a rolling bearing.

A rolling bearing of a first aspect of the invention includes: an inner ring and an outer ring disposed coaxially with each other; a rolling element disposed between the inner ring and the outer ring; a seal member mounted on one bearing ring of the inner ring and the outer ring and configured to cover a space between the inner ring and the outer ring from an outside in an axial direction; and grease disposed between the rolling element and the seal member. The grease is in contact with at least one of a circumferential surface of the one bearing ring facing the other bearing ring of the inner ring and the outer ring and the seal member, or is disposed in a retainer which holds the rolling element rollable, and unworked penetration of the grease is more than 178 and less than 287.

According to the first aspect, a portion of the grease which is not in contact with the rolling element and the retainer is relatively soft, and an oil is easily separated to an outside. Therefore, even when a base oil in a portion of the grease which is in contact with the rolling element or the retainer is likely to be insufficient, the base oil can seep out to the outside from an inside of the grease which is not in contact with the rolling element and the retainer, and the base oil can be continuously supplied to the sliding portion. Even in a state where the grease is applied so as not to be in contact with the rolling element and the retainer, the base oil can be supplied from a surface of the grease to the sliding portion, and the base oil can seep out from the inside of the grease onto the surface of the grease, and can be supplied to the sliding portion. Therefore, even when the grease is disposed at a position away from the rolling element and the retainer in order to reduce rotational resistance of the rolling bearing, the base oil can be supplied to the sliding portion over a long period of time, and durability of the rolling bearing can be improved.

Since the unworked penetration is less than 287, excessive deformation of the grease by dripping of the grease due to gravity, co-rotation, or the like can be prevented, and a shape of the portion of the grease which is not in contact with the rolling element and the retainer can be maintained as an initial shape. Accordingly, it is possible to prevent occurrence of variations in the rotational resistance due to a shape of the grease being different for each rolling bearing.

The rolling bearing of a second aspect of the invention may be configured such that in the rolling bearing according to the first aspect, a difference between worked penetration and the unworked penetration of the grease is less than 50.

According to the second aspect, softness of a portion of the grease which is not in contact with the rolling element and the retainer is close to softness of a portion of the grease which is in contact with the rolling element and the retainer. Accordingly, a difference in a degree of seepage of the base oil between the portion of the grease which is in contact with the rolling element or the retainer and the portion of the grease which is not in contact with the rolling element and the retainer is reduced. Therefore, the rotational resistance of the rolling bearing can be stabilized for a long period of time.

The rolling bearing of a third aspect of the invention may be configured such that in the rolling bearing according to the first aspect or the second aspect, a ratio of a difference between the worked penetration and the unworked penetration to the worked penetration of the grease is less than 22.7%.

According to the third aspect, the softness of the portion of the grease which is not in contact with the rolling element and the retainer is close to the softness of the portion of the grease which is in contact with the rolling element or the retainer. Accordingly, a difference in the degree of seepage of the base oil between the portion of the grease which is in contact with the rolling element or the retainer and the portion of the grease which is not in contact with the rolling element and the retainer is reduced. Therefore, the rotational resistance of the rolling bearing can be stabilized for a long period of time.

The rolling bearing of a fourth aspect of the invention may be configured such that in the rolling bearing according to any one of the first aspect to the third aspect, a thickener of the grease contains urea.

According to the fourth aspect, since grease having high heat resistance can be obtained, the rolling bearing having low rotational resistance and high durability can be formed.

The rolling bearing of a fifth aspect of the invention may be configured such that in the rolling bearing according to any one of the first aspect to the fourth aspect, the unworked penetration of the grease after standing at 85° C. for 18 hours is more than 158.

According to the fifth aspect, a degree of hardening of the grease can be set to such an extent that the base oil seeps out smoothly, even when the grease is exposed to a high temperature or left to stand for a long time. Therefore, the rolling bearing having high durability can be formed.

The rolling bearing of a sixth aspect of the invention may be configured such that in the rolling bearing according to any one of the first aspect to the fifth aspect, the seal member includes an annular pedestal portion which is in contact with the one bearing ring from the outside in the axial direction, an extending portion which extends outward in the axial direction from a circumferential edge of the pedestal portion on the other bearing ring side, and a flat surface portion which extends along a radial direction from an end edge of the extending portion on the outside in the axial direction toward the other bearing ring, and the grease is in contact with at least one of the pedestal portion and the extending portion.

According to the sixth aspect, when the seal member is mounted on the one bearing ring after the grease is applied to a predetermined location, the grease may be pushed inward in the axial direction by the pedestal portion and the extending portion of the seal member, which are positioned inward of the flat surface portion in the axial direction. Since the pedestal portion and the extending portion are positioned closer to the rolling element and the retainer than the flat surface portion, grease is pushed toward the rolling element and the retainer side when the seal member is mounted, and is likely to come into contact with the rolling element or the retainer. Here, in grease having a relatively small unworked penetration (hard) as in the related art, when the grease is pushed inward in an axial direction by a seal member, the entire grease may move inward in the axial direction with slight deformation, and the grease may come into contact with a rolling element or a retainer by a desired amount or more. According to the sixth aspect, since the grease has a relatively large unworked penetration (soft), the grease is easily deformed in the radial direction when the grease is pushed inward in the axial direction by the seal member, the grease is prevented from moving inward in the axial direction, and the grease is prevented from coming into contact with the rolling element or the retainer more than necessary. Therefore, the grease described above can be suitably used.

The rolling bearing of a seventh aspect of the invention may be configured such that in the rolling bearing according to any one of the first aspect to the sixth aspect, the seal member includes an annular pedestal portion which is in contact with the one bearing ring from the outside in the axial direction, an extending portion which extends outward in the axial direction from a circumferential edge of the pedestal portion on the other bearing ring side, and a flat surface portion which extends along a radial direction from an end edge of the extending portion on the outside in the axial direction toward the other bearing ring, the grease includes a bearing ring contact portion which is in contact with the circumferential surface of the one bearing ring, and a seal member contact portion which is in contact with the flat surface portion on the outside in the axial direction and on the other bearing ring side relative to the bearing ring contact portion, and an area of the seal member contact portion is larger than a contact area between the grease and the extending portion and the pedestal portion of the seal member.

According to the seventh aspect, when the seal member is mounted after the grease is applied to a predetermined location, it is possible to provide a room for the grease which is pressed inward in the axial direction by the flat surface portion of the seal member to spread in the radial direction toward the extending portion and the pedestal portion. Therefore, it is possible to prevent the grease from greatly spreading to a one bearing ring side and a rolling element side. Therefore, it is possible to easily prevent the grease from coming into direct contact with the rolling element and the one bearing ring.

Further, since the seal member is provided with the extending portion between the flat surface portion and the pedestal portion, as compared with a configuration in which a flat surface portion extends from a pedestal portion along a radial direction, the grease can be disposed at a position further separated from the rolling element. Therefore, an amount of the grease can be increased.

As described above, it is possible to provide the rolling bearing which can both ensure the durability and reduce the rotational resistance.

The rolling bearing of an eighth aspect of the invention may be configured such that in the rolling bearing according to the seventh aspect, the seal member contact portion includes a center position of the grease in the radial direction when viewed from the axial direction.

According to the eighth aspect, when the seal member is mounted, the grease spreads in the radial direction by being pressed by the flat surface portion. As a result, since the seal member contact portion includes the center position of the grease in the radial direction in a plan view, it is possible to prevent the grease from greatly spreading inward in the axial direction toward the rolling element. Therefore, it is possible to easily prevent the grease from coming into direct contact with the rolling element.

The rolling bearing of a ninth aspect of the invention may be configured such that in the rolling bearing according to the seventh aspect or the eighth aspect, the grease is not in contact with the extending portion.

According to the ninth aspect, when the seal member is mounted, it is possible to provide a larger room for the grease which is pressed inward in the axial direction by the flat surface portion of the seal member to spread in the radial direction toward the extending portion. Therefore, it is possible to prevent the grease from greatly spreading to the one bearing ring side and the rolling element side. Therefore, it is possible to easily prevent the grease from coming into contact with the rolling element, the retainer, and the one bearing ring more than necessary.

The rolling bearing of a tenth aspect of the invention may be configured such that in the rolling bearing according to any one of the seventh aspect to the ninth aspect, the bearing ring contact portion is provided at an interval from a contact portion between the one bearing ring and the pedestal portion in the axial direction.

According to the tenth aspect, it is possible to prevent the grease from coming into contact with the contact portion between the bearing ring and the pedestal portion. Accordingly, it is possible to prevent the grease from leaking to an outside of the seal member due to a capillary phenomenon through the contact portion between the bearing ring and the pedestal portion.

The rolling bearing of an eleventh aspect of the invention may be configured such that in the rolling bearing according to any one of the seventh aspect to the tenth aspect, the grease is not in contact with the pedestal portion.

According to the eleventh aspect, it is possible to prevent the grease from coming into contact with the contact portion between the bearing ring and the pedestal portion. Accordingly, it is possible to prevent the grease from leaking to the outside of the seal member due to the capillary phenomenon through the contact portion between the bearing ring and the pedestal portion.

The rolling bearing of a twelfth aspect of the invention may be configured such that in the rolling bearing according to any one of the seventh aspect to the eleventh aspect, the one bearing ring includes a protruding portion which protrudes toward the other bearing ring side and on which a raceway surface is formed, the protruding portion includes an end surface which faces the outside in the axial direction, which is connected to the circumferential surface at a circumferential edge on the other bearing ring side, and which is in contact with the pedestal portion, and the pedestal portion does not protrude toward the other bearing ring side relative to the end surface when viewed from the axial direction.

According to the twelfth aspect, even when the bearing ring contact portion of the grease spreads outward in the axial direction and climbs over a circumferential edge of the end surface, it is possible to prevent the grease from adhering to the pedestal portion. Therefore, it is possible to prevent the grease from coming into contact with the contact portion between the bearing ring and the pedestal portion. Accordingly, it is possible to prevent the grease from leaking to the outside of the seal member due to the capillary phenomenon through the contact portion between the bearing ring and the pedestal portion.

A rotation device of a thirteenth aspect of the invention includes: a rotation body which is rotatably disposed; a support body which rotatably supports the rotation body; and the rolling bearing according to any one of the first aspect to the twelfth aspect, which is interposed between the rotation body and the support body.

According to the thirteenth aspect, a long life of the rotation device can be achieved by including the rolling bearing having excellent long-term durability.

A method for manufacturing a rolling bearing of a fourteenth aspect of the invention, the rolling bearing including an inner ring and an outer ring disposed coaxially with each other, a rolling element disposed between the inner ring and the outer ring, a seal member mounted on one bearing ring of the inner ring and the outer ring and configured to cover a space between the inner ring and the outer ring from an outside in an axial direction, and grease disposed between the rolling element and the seal member, the seal member including an annular pedestal portion which is in contact with the one bearing ring from the outside in the axial direction, an extending portion which extends outward in the axial direction from a circumferential edge of the pedestal portion on the other bearing ring side of the inner ring and the outer ring, and a flat surface portion which extends along a radial direction from an end edge of the extending portion on the outside in the axial direction toward the other bearing ring, the method for manufacturing a rolling bearing includes: an application step of bringing the grease into contact with the one bearing ring, and applying the grease so as to protrude outward in the axial direction and toward the other bearing ring side from a contact portion with the one bearing ring; a contact step of bringing the seal member close to the one bearing ring from the outside in the axial direction to bring the flat surface portion into contact with an end edge of the grease on the outside in the axial direction; and a mounting step of, after the contact step, bringing the seal member close to the one bearing ring to bring the pedestal portion into contact with the one bearing ring from the outside in the axial direction, and pressing the grease inward in the axial direction by the flat surface portion, in which unworked penetration of the grease is more than 178 and less than 287.

According to the fourteenth aspect, since the flat surface portion of the seal member is in contact with the end edge of the grease on the outside in the axial direction in the contact step, in a process of pressing the grease inward in the axial direction by the flat surface portion in the mounting step, it is possible to provide a room for the grease to spread in the radial direction toward the extending portion and the pedestal portion of the seal member. Therefore, it is possible to prevent the grease from greatly spreading to the other bearing ring side and the rolling element side. Therefore, it is possible to easily prevent the grease from coming into direct contact with the rolling element and the other bearing ring.

Further, since the unworked penetration of the grease is relatively small, the grease can be easily deformed in the radial direction when the grease is pushed inward in the axial direction by the seal member. Accordingly, it is possible to prevent the grease from moving inward in the axial direction and to prevent the grease from coming into contact with the rolling element or the retainer more than necessary.

Further, since the extending portion is provided between the flat surface portion and the pedestal portion, as compared with a configuration in which a flat surface portion extends toward the other bearing ring side from a pedestal portion, the grease is less likely to be pushed toward the rolling element side. Therefore, the grease can be disposed in advance at a position closer to the rolling element, so that the amount of the grease can be increased.

As described above, it is possible to manufacture the rolling bearing which can both ensure the durability and reduce the rotational resistance.

According to the invention, the rolling bearing excellent in long-term durability can be provided.

DETAILED DESCRIPTION OF THE PREFERRED EMBODIMENTS

Embodiments of the invention will be described below with reference to the drawings. In the following description, configurations having the same or similar functions are denoted by the same reference signs. Repeated description for these configurations may be omitted.

First Embodiment

A first embodiment of the invention will be described with reference to FIGS. 1 and 2.

Figures 1, 2:
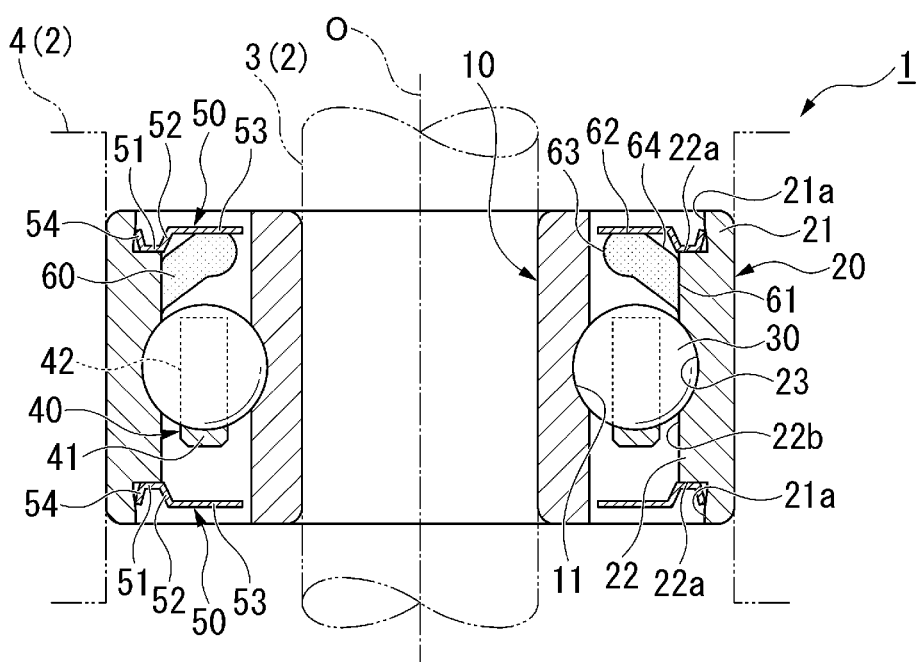
FIG. 1 is a plan view of a rolling bearing according to a first embodiment.
FIG. 2 is a longitudinal cross-sectional view taken along a line II-II in FIG. 1.

FIG. 1 is a plan view of a rolling bearing according to the first embodiment. FIG. 2 is a longitudinal cross-sectional view taken along a line II-II in FIG. 1. In FIG. 2, a rotation device 2 on which a rolling bearing 1 is mounted is indicated by a virtual line.

As shown in FIGS. 1 and 2, the rolling bearing 1 is a radial ball bearing including an inner ring 10 and an outer ring 20 which are bearing rings, a plurality of rolling elements 30, a retainer 40, and a pair of seal members 50. The rolling bearing 1 is provided in the rotation device 2 such as a fan motor. The rotation device 2 includes a shaft 3 (rotation body) which is rotatable around a common axis O, and a housing 4 (support body) which is fixedly disposed and rotatably supports the shaft 3. The rolling bearing 1 is interposed between the shaft 3 and the housing 4.

The inner ring 10 and the outer ring 20 are disposed coaxially with each other such that central axes of the inner ring 10 and the outer ring 20 coincide with the common axis O. In the present embodiment, a direction in which the common axis O extends is referred to as an axial direction, a direction which is orthogonal to the common axis O and radially extends from the common axis O is referred to as a radial direction, and a direction around the common axis O is referred to as a circumferential direction. Between directions parallel to the axial direction and oriented in directions opposite to each other, one is defined as an upper side, and the other is defined as a lower side.

The inner ring 10 is provided as a rotation ring. The inner ring 10 is externally fitted to the shaft 3 and is fixed to the shaft 3. The outer ring 20 is provided as a fixed ring. The outer ring 20 is fitted into a recessed portion (or a through hole) of the housing 4 and is fixed to the housing 4. The outer ring 20 surrounds the inner ring 10 from an outside in the radial direction in a state where an annular space is provided between the outer ring 20 and the inner ring 10. The plurality of rolling elements 30 are arranged between the inner ring 10 and the outer ring 20, and are held by the retainer 40 so as to be rollable. The retainer 40 holds the plurality of rolling elements 30 rotatable in a state where the rolling elements 30 are evenly arranged in the circumferential direction. Each of the seal members 50 is mounted on the outer ring 20, and covers the annular space between the inner ring 10 and the outer ring 20 from an outside in the axial direction.

The outer ring 20 is made of a metal material such as stainless steel or bearing steel and has a circular ring shape. The outer ring 20 is not limited to being made of a metal, and may be formed of other materials. The outer ring 20 includes an outer ring body 21 having a width along the axial direction equal to a width of the inner ring 10 along the axial direction, and a protruding portion 22 which protrudes inward in the radial direction from the outer ring body 21 and extends in the entire circumferential direction. The protruding portion 22 is formed at a portion positioned at a center of the outer ring body 21 in the axial direction. A width of the protruding portion 22 along the axial direction is smaller than a width of the outer ring body 21 along the axial direction, and is larger than an outer diameter of each of the rolling elements 30.

The protruding portion 22 includes a pair of end surfaces 22*a* facing outward in the axial direction, and an inner circumferential surface 22*b* which connects inner circumferential edges of the pair of end surfaces 22*a*. The end surfaces 22*a* extend in parallel in both the radial direction and the circumferential direction. An outer ring raceway surface 23 recessed outward in the radial direction is formed on the inner circumferential surface 22*b*. The outer ring raceway surface 23 is formed in a hemispherical shape in a cross-sectional view along outer surfaces of the rolling elements 30, and is formed in an annular shape which extends in the circumferential direction over an entire circumference of the inner circumferential surface 22*b*. The outer ring raceway surface 23 is formed in a portion positioned at a center of the inner circumferential surface 22*b* in the axial direction. A portion of the inner circumferential surface 22*b* excluding the outer ring raceway surface 23 extends in the axial direction with a constant inner diameter.

The outer ring body 21 has a pair of inner circumferential surfaces 21*a* extending from an outer circumferential edge of a respective one of the end surfaces 22*a* of the protruding portion 22 to an opening edge of the outer ring 20. A portion of each of the inner circumferential surfaces 21*a* positioned inside in the axial direction is positioned outside in the radial direction relative to a portion of the inner circumferential surface 21*a* positioned outside in the axial direction.

The inner ring 10 is made of a metal material such as stainless steel or bearing steel and has a circular ring shape. The inner ring 10 is not limited to being made of a metal, and may be formed of other materials. An inner ring raceway surface 11 recessed inward in the radial direction is formed on an outer circumferential surface of the inner ring 10. The inner ring raceway surface 11 is formed in a hemispherical shape in the cross-sectional view along the outer surfaces of the rolling elements 30, and is formed in an annular shape which extends in the circumferential direction over an entire circumference of the outer circumferential surface. The inner ring raceway surface 11 is formed in a portion positioned at a center of the outer circumferential surface of the inner ring 10 in the axial direction, and faces the outer ring raceway surface 23 in the radial direction. A portion of the outer circumferential surface of the inner ring 10 excluding the inner ring raceway surface 11 extends in the axial direction with a constant outer diameter.

As shown in FIG. 2, the plurality of rolling elements 30 are formed of a metal material such as stainless steel or bearing steel in a spherical shape. The plurality of rolling elements 30 are arranged between the outer ring raceway surface 23 and the inner ring raceway surface 11, and are supported by the outer ring raceway surface 23 and the inner ring raceway surface 11 in a rollable manner. The plurality of rolling elements 30 are kept at intervals in the circumferential direction by the retainer 40.

The retainer 40 is made of a synthetic resin or a metal material and has a circular ring shape as a whole. The retainer 40 is disposed around the common axis O. The retainer 40 includes an annular portion 41 formed in a circular ring shape and disposed on a lower side of the plurality of rolling elements 30, and a plurality of column portions 42 which protrude upward from the annular portion 41 and are provided at intervals in the circumferential direction. The column portions 42 are arranged evenly in the circumferential direction. A pair of column portions 42 adjacent to each other in the circumferential direction forms a ball pocket therebetween. The ball pocket penetrates through the retainer 40 in the radial direction, and is open upward in an upper end surface of the retainer 40. Ball pockets are provided corresponding to the number of the rolling elements 30, and hold the rolling elements 30 individually in a rollable manner. Accordingly, the retainer 40 arranges the rolling elements 30 evenly at intervals in the circumferential direction. The retainer 40 is disposed with gaps from the inner ring 10 and the outer ring 20 so as not to interfere with the inner ring 10 and the outer ring 20. In the present embodiment, the entire retainer 40 is positioned inside in the axial direction relative to the pair of end surfaces 22a of the protruding portion 22 of the outer ring 20.

As shown in FIGS. 1 and 2, the seal member 50 is formed in a circular-ring-shaped plate shape. The seal member 50 is disposed around the common axis O. The seal member 50 is formed uniformly over an entire circumference. The seal member 50 is fitted into the outer ring 20 from the outside in the axial direction. The seal members 50 are disposed on both sides in the axial direction of the plurality of rolling elements 30 respectively. The seal member 50 includes an annular pedestal portion 51 which is in contact with the outer ring 20 from the outside in the axial direction, an extending portion 52 which extends outward in the axial direction from an inner circumferential edge of the pedestal portion 51, a flat surface portion 53 which extends along the radial direction from an end edge of the extending portion 52 on the outside in the axial direction toward the inner ring 10, and a locking portion 54 which extends outward in the radial direction and outward in the axial direction from an outer circumferential edge of the pedestal portion 51.

As shown in FIG. 2, the pedestal portion 51 overlaps the end surface 22a of the protruding portion 22 of the outer ring 20 from the outside in the axial direction. The pedestal portion 51 extends substantially parallel to the end surface 22a of the protruding portion 22 of the outer ring 20. The pedestal portion 51 protrudes inward in the radial direction relative to the end surface 22a of the protruding portion 22 in a plan view when viewed from the axial direction. A distance by which the pedestal portion 51 protrudes inward in the radial direction from the end surface 22a of the protruding portion 22 is 10% or less of an interval between the inner ring 10 and the outer ring 20 in the radial direction, and is preferably 5% or less of the interval. The extending portion 52 extends outward in the axial direction and inward in the radial direction from the inner circumferential edge of the pedestal portion 51. The flat surface portion 53 overlaps a center of the rolling element 30 in the plan view. An inner circumferential edge of the flat surface portion 53 is disposed at the outer circumferential surface of the inner ring 10 with a gap therebetween. A surface of the flat surface portion 53 facing inward in the axial direction is a flat surface which extends in the circumferential direction and the radial direction. An outer circumferential edge of the locking portion 54 is locked to the inner circumferential surface 21a of the outer ring body 21 from an inside in the axial direction. Accordingly, the seal member 50 is fixed to the outer ring 20 and rotates integrally with the outer ring 20 with respect to the inner ring 10.

The rolling bearing 1 is enclosed with grease 60. The grease 60 contains a base oil and a thickener, and when the grease 60 is stirred and subjected to shearing, the base oil held by the thickener seeps out and imparts a lubricating effect to a sliding portion. The grease 60 is disposed between the rolling element 30 and the seal member 50. The grease 60 is disposed only on one side of the annular space between the inner ring 10 and the outer ring 20 in the axial direction with respect to the rolling element 30. In the present embodiment, the grease 60 is disposed on a side opposite to the annular portion 41 of the retainer 40 with the rolling element 30 being sandwiched therebetween in the axial direction. That is, the grease 60 is disposed above the rolling element 30. The grease 60 is disposed along the circumferential direction. The grease 60 extends in a circular ring shape or an arc shape, and is disposed coaxially with the common axis O.

The grease 60 includes an outer ring contact portion 61 (bearing ring contact portion) which is in contact with the inner circumferential surface 22b of the protruding portion 22 of the outer ring 20, and a seal member contact portion 62 which is in contact with the flat surface portion 53 of the seal member 50 on the outside in the axial direction and on an inside in the radial direction relative to the outer ring contact portion 61. The outer ring contact portion 61 and the seal member contact portion 62 extend in the circumferential direction over an entire length of the grease 60. The outer ring contact portion 61 has a width in the axial direction over the entire circumferential direction. The outer ring contact portion 61 is in contact with a location of the inner circumferential surface 22b of the protruding portion 22 at an interval from the outer ring raceway surface 23 in the axial direction. The outer ring contact portion 61 is in contact with a location of the inner circumferential surface 22b of the protruding portion 22 at an interval from an inner circumferential edge of the end surface 22a on an upper side in the axial direction. That is, the outer ring contact portion 61 is provided at an interval from a contact portion between the outer ring 20 and the pedestal portion 51 of the seal member 50 in the axial direction. The seal member contact portion 62 has a width in the radial direction over the entire circumferential direction. The seal member contact portion 62 is in contact with the flat surface portion 53 at a location at an interval from a connection portion between the extending portion 52 and the flat surface portion 53 of the seal member 50 in the radial direction.

The grease 60 extends outward in the axial direction and inward in the radial direction from the outer ring contact portion 61 toward the seal member contact portion 62. The grease 60 includes an inner surface 63 and an outer surface 64.

The inner surface 63 connects an end edge of the outer ring contact portion 61 on the inside in the axial direction and an end edge of the seal member contact portion 62 on the inside in the radial direction. The inner surface 63 faces the outer circumferential surface of the inner ring 10 and the rolling element 30. An upper half portion of the inner surface 63 extends inward in the axial direction and inward in the radial direction from the end edge of the seal member contact portion 62 on the inside in the radial direction. A lower half portion of the inner surface 63 extends outward in the axial direction and inward in the radial direction from the end edge of the outer ring contact portion 61 on the inside in the axial direction, and is connected to a lower end edge in the upper half portion. A boundary portion between the upper half portion and the lower half portion of the inner surface 63 forms an inner circumferential edge of the grease 60 positioned on the innermost side in the radial direction. The inner surface 63 is separated from the inner ring 10, the rolling element 30, and the retainer 40. Accordingly, the grease 60 is not in contact with the inner ring 10, the rolling element 30, and the retainer 40.

The outer surface 64 connects an end edge of the outer ring contact portion 61 on the outside in the axial direction and an end edge of the seal member contact portion 62 on the outside in the radial direction. The outer surface 64 faces the inner circumferential surface 22b of the protruding portion 22 of the outer ring 20 and the seal member 50. The outer surface 64 extends inward in the axial direction and outward in the radial direction from the end edge of the seal member contact portion 62 on the outside in the radial direction, and is connected to the end edge of the outer ring contact portion 61 on the outside in the axial direction. The outer surface 64 is separated from the pedestal portion 51 and the extending portion 52 of the seal member 50. Accordingly, the grease 60 is not in contact with the pedestal portion 51 and the extending portion 52 of the seal member 50, which are positioned closer to an outer ring 20 side than the flat surface portion 53 of the seal member 50.

The grease 60 is formed such that a cross-sectional area of a cross section along a vertical plane of the common axis O gradually increases from an end portion on the outside in the axial direction toward the inside in the axial direction. In the present embodiment, the grease 60 is formed such that the cross-sectional area of the cross section along the vertical plane of the common axis O gradually increases from the end portion on the outside in the axial direction toward the inside in the axial direction at a portion corresponding to the upper half portion of the inner surface 63.

The grease 60 may be in contact with at least one of the rolling element 30 and the retainer 40. For example, the grease 60 may be in contact with at least one of the rolling element 30 and the retainer 40 due to a change over time from an initial state in which the grease 60 is not in contact with the rolling element 30 and the retainer 40.

A configuration of the grease 60 will be described. The grease 60 may contain components other than the base oil and the thickener as necessary.

The base oil is not particularly limited, and examples thereof include a mineral oil and a synthetic oil. As the mineral oil, a known mineral oil used as the base oil can be used, and examples thereof include a naphthenic mineral oil, a paraffinic mineral oil, a hydrogenated mineral oil, a solvent-refined mineral oil, and a highly refined mineral oil. The mineral oil may be used alone or in combination of two or more types thereof. For example, a plurality of types of mineral oils may be mixed and adjusted to desired properties.

As the synthetic oil, a known synthetic oil used as the base oil can be used, and examples thereof include an aliphatic hydrocarbon oil such as a poly-α-olefin (PAO) and a polybutene; an aromatic hydrocarbon oil such as an alkylbenzene and an alkylnaphthalene; an ester oil such as a polyol ester and a phosphate ester; an ether oil such as a polyphenyl ether; a polyalkylene glycol oil; a silicone oil; and a fluorine oil. These synthetic oils may be used alone or in combination of two or more types thereof. For example, a plurality of types of synthetic oils may be mixed and adjusted to desired properties.

The thickener serves to keep the grease 60 in a semi-solid state. As the thickener, a known thickener commonly used for grease for a rolling bearing can be used without limitation. Examples of the thickener include a urea compound, a lithium soap, a calcium soap, a composite lithium soap, a composite calcium soap, a silica gel, polytetrafluoroethylene, and an organized bentonite. The thickener is preferably a urea compound from a viewpoint of excellent heat resistance. The thickener may be used alone or in combination of two or more types thereof. For example, a plurality of types of thickeners may be mixed and adjusted to desired properties.

Unworked penetration of the grease 60 of the present embodiment is more than 178 and less than 287. A difference between worked penetration and the unworked penetration of the grease 60 is preferably less than 50. A ratio of the difference between the worked penetration and the unworked penetration to the worked penetration of the grease 60 is preferably less than 22.7%. The unworked penetration of the grease 60 after standing at 85° C. for 18 hours is preferably more than 158. In the following description, standing at 85° C. for 18 hours is referred to as high-temperature standing.

Next, a method for manufacturing the rolling bearing 1 of the present embodiment will be described.

The method for manufacturing the rolling bearing 1 of the present embodiment includes an application step and a sealing step.

Figure 3:
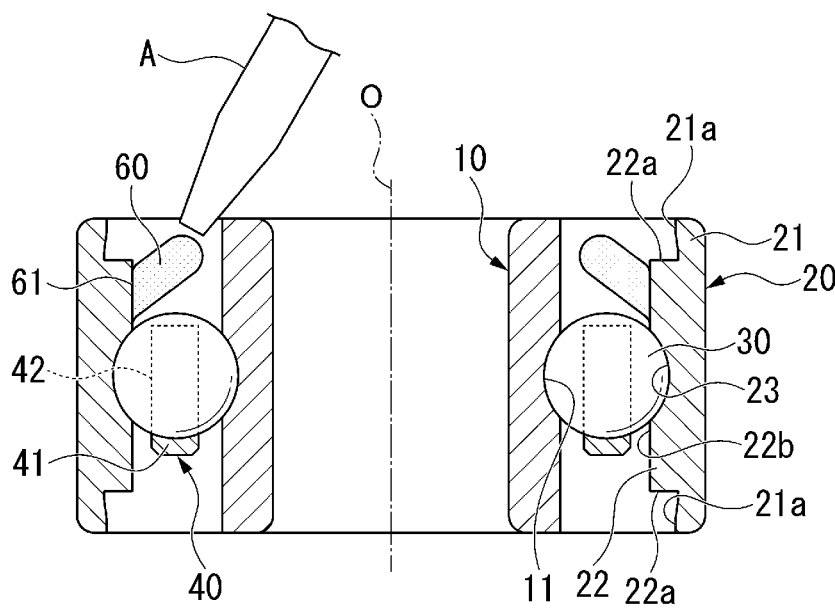
FIG. 3 is a longitudinal cross-sectional view of the rolling bearing showing a method for applying grease according to the first embodiment.
Figure 4:
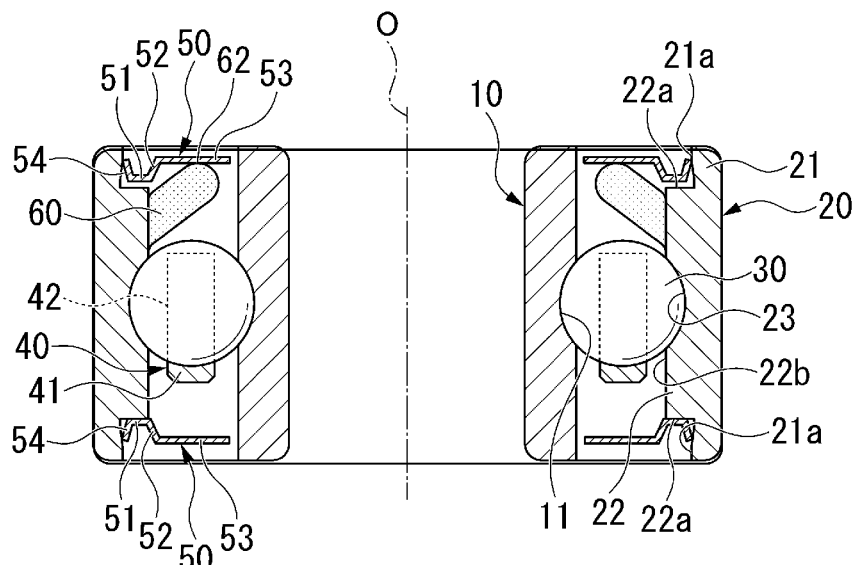
FIG. 4 is a longitudinal cross-sectional view of the rolling bearing showing the method for applying the grease according to the first embodiment.

FIGS. 3 and 4 are longitudinal cross-sectional views of the rolling bearing showing a method for applying the grease according to the first embodiment.

As shown in FIG. 3, the application step is performed in a state where the seal member 50 is not attached to the outer ring 20. That is, the grease 60 is applied in a state where the annular space between the inner ring 10 and the outer ring 20 is open in the axial direction and the rolling elements 30 and the retainer 40 are exposed. In the application step, the grease 60 is discharged from a nozzle A while the nozzle A is rotated around the common axis O with respect to the outer ring 20. At this time, a direction of the nozzle A is adjusted such that the grease 60 is discharged outward in the radial direction and inward in the axial direction from the nozzle A. Further, a position of the nozzle A is adjusted such that the discharged grease 60 is in contact with a predetermined position of the inner circumferential surface 22b of the protruding portion 22 of the outer ring 20 and the grease 60 is not in contact with the rolling elements 30 and the retainer 40. Since the grease 60 is discharged while the nozzle A is rotated relative to the outer ring 20, the grease 60 applied to the outer ring 20 extends in a circumferential shape or an arc shape. The grease 60 is applied so as to protrude outward in the axial direction and inward in the radial direction from a contact portion with the outer ring 20 in accordance with a discharge direction from the nozzle A. An end surface of the applied grease 60 on the outside in the axial direction is formed in a convex shape bulging outward in the axial direction.

Next, the sealing step is performed. As shown in FIG. 4, in the sealing step, the seal member 50 is brought close to the outer ring 20 from the outside in the axial direction to mount the seal member 50 on the outer ring 20. In a process of displacing the seal member 50 inward in the axial direction, before the pedestal portion 51 comes into contact with the end surface 22a of the protruding portion 22 of the outer ring 20, first, the flat surface portion 53 of the seal member 50 is brought into contact with an end edge of the entire grease 60 on the outside in the axial direction (contact step). At this time, the grease 60 is brought into contact with a radially intermediate portion of the flat surface portion 53. The radially intermediate portion may be positioned on the inside in the radial direction relative to an outer circumferential edge of the flat surface portion 53 and on the outside in the radial direction relative to the inner circumferential edge of the flat surface portion 53. Thereafter, the pedestal portion 51 is brought into contact with the end surface 22a of the protruding portion 22 of the outer ring 20 from the outside in the axial direction by further bringing the seal member 50 close to the outer ring 20 (mounting step). At this time, the grease 60 is pressed inward in the axial direction by the flat surface portion 53 of the seal member 50. Accordingly, the grease 60 spreads in the radial direction by being pressed by the flat surface portion 53, and the seal member contact portion 62 of the grease 60 is formed.

As described above, the rolling bearing 1 is formed. In the application step of the present embodiment, the grease 60 is applied while the nozzle A is rotated with respect to the outer ring 20, but the grease may be discharged from a nozzle having a discharge hole extending in the circumferential direction, and the grease may be collectively applied in a circumferential shape or an arc shape.

Functions of the present embodiment will be described.

The grease 60 is disposed between the rolling element 30 and the seal member 50, and most of (or the entire) the grease 60 is not in contact with the rolling element 30 and the retainer 40. That is, only a small portion of the grease 60 comes into contact with the rolling element 30 or the retainer 40 and is subjected to shearing during an operation of the rolling bearing 1, and the grease 60 may not come into contact with the rolling element 30 and the retainer 40.

Here, the grease has different hardness between a state in which the grease is not subjected to shearing (a state of being unworked) and a state in which the grease is subjected to shearing (a state of being worked). In general, the grease becomes soft when being subjected to shearing. Therefore, a portion of the grease 60 which is in contact with the inner ring 10, the rolling element 30, or the retainer 40 is continuously subjected to shearing from the rolling element 30 or the retainer 40 and becomes soft, thereby promoting seepage of the base oil. On the other hand, a portion of the grease 60 which is not in contact with the rolling element 30 and the retainer 40 remains in a hard state. In a case where a portion of the grease 60 which is in contact with the rolling element 30 or the retainer 40 is small, when the base oil which seeps out from the portion which is subjected to shearing by the rolling element 30 or the retainer 40 is insufficient, most of the grease 60 is not stirred and remains in a hard state, supply of the base oil is insufficient and a service life of the rolling bearing 1 expires. The same applies to a case where the entire grease 60 is not in contact with the rolling element 30 and the retainer 40.

There are worked penetration and unworked penetration as an index indicating properties related to hardness of grease. The worked penetration is an index of the hardness of the grease immediately after being subjected to shearing. Therefore, a state of the grease at the time of measuring the worked penetration is close to a state of a portion of the grease which comes into contact with the rolling element or the retainer and which is subjected to shearing in the rolling bearing. On the other hand, the unworked penetration is an index of the hardness of the grease in a state of not being subjected to shearing. Therefore, a state of the grease at the time of measuring the unworked penetration is close to a state of a portion of the grease which is not in contact with the rolling element and the retainer in the rolling bearing.

The rolling bearing 1 of the present embodiment includes the grease 60 which is in contact with an inner circumferential surface of the outer ring 20 and the seal member 50. The unworked penetration of the grease 60 is more than 178 and less than 287. According to this configuration, a portion of the grease 60 which is not in contact with the rolling element 30 and the retainer 40 is relatively soft, and an oil is easily separated to an outside. Therefore, even when the base oil in the portion of the grease 60 which is in contact with the rolling element 30 or the retainer 40 is likely to be insufficient, the base oil can seep out to the outside from an inside of the grease 60 which is not in contact with the rolling element 30 and the retainer 40, and the base oil can be continuously supplied to the sliding portion. Even in a state where the grease 60 is applied so as not to be in contact with the rolling element 30 and the retainer 40, the base oil can be supplied from a surface of the grease 60 to the sliding portion, and the base oil can seep out from the inside of the grease 60 onto the surface of the grease 60, and can be supplied to the sliding portion. Therefore, even when the grease 60 is disposed at a position away from the rolling element 30 and the retainer 40 in order to reduce rotational resistance of the rolling bearing 1, the base oil can be supplied to the sliding portion over a long period of time, and durability of the rolling bearing 1 can be improved.

Since the unworked penetration is less than 287, excessive deformation of the grease 60 by dripping of the grease 60 due to gravity or co-rotation can be prevented, and a shape of the portion of the grease 60 which is not in contact with the rolling element 30 and the retainer 40 can be maintained as an initial shape. Accordingly, it is possible to prevent occurrence of variations in the rotational resistance due to a shape of the grease 60 being different for each rolling bearing 1.

Since the grease 60 is in contact with the inner circumferential surface of the outer ring 20, the grease 60 is easily supplied to the outer ring raceway surface 23. Therefore, the base oil can be supplied to the sliding portion between the outer ring 20 and the rolling element 30 over a long period of time, and the durability of the rolling bearing 1 can be improved.

Further, in the present embodiment, the grease 60 is in contact with both the inner circumferential surface of the outer ring 20 and the seal member 50. In this configuration, after the grease 60 is applied to the outer ring 20 when the grease 60 is used to enclose between the outer ring 20 and the inner ring 10, the grease 60 is pushed inward in the axial direction by the seal member 50 when the seal member 50 is mounted on the outer ring 20. Here, in grease having a relatively small unworked penetration (hard) as in the related art, when the grease is pushed inward in the axial direction by the seal member, the entire grease may move inward in the axial direction with slight deformation, and the grease may come into contact with the rolling element 30 or the retainer 40 by a desired amount or more. In the present embodiment, since the grease 60 has a relatively large unworked penetration (soft), the grease 60 is easily deformed in the radial direction when the grease 60 is pushed inward in the axial direction by the seal member 50, and the grease 60 is prevented from moving inward in the axial direction, so that the grease 60 is prevented from coming into contact with the rolling element 30 or the retainer 40 more than necessary. Therefore, an increase in the rotational resistance of the rolling bearing 1 can be prevented.

Since the difference between the worked penetration and the unworked penetration of the grease 60 is less than 50, softness of a portion of the grease 60 which is not in contact with the rolling element 30 and the retainer 40 is close to softness of a portion of the grease 60 which is in contact with the rolling element 30 and the retainer 40. Accordingly, a difference in a degree of seepage of the base oil between the portion of the grease 60 which is in contact with the rolling element 30 or the retainer 40 and the portion of the grease 60 which is not in contact with the rolling element 30 and the retainer 40 is reduced. Therefore, the rotational resistance of the rolling bearing 1 can be stabilized for a long period of time.

Since the ratio of the difference between the worked penetration and the unworked penetration to the worked penetration of the grease 60 is less than 22.7%, the softness of the portion of the grease 60 which is not in contact with the rolling element 30 and the retainer 40 is close to the softness of the portion of the grease 60 which is in contact with the rolling element 30 or the retainer 40. Accordingly, a difference in the degree of seepage of the base oil between the portion of the grease 60 which is in contact with the rolling element 30 or the retainer 40 and the portion of the grease 60 which is not in contact with the rolling element 30 and the retainer 40 is reduced. Therefore, the rotational resistance of the rolling bearing 1 can be stabilized for a long period of time.

The thickener of the grease 60 contains urea. According to this configuration, since grease having high heat resistance can be obtained, the rolling bearing 1 having low rotational resistance and high durability can be formed. In general, in the grease using urea as the thickener, the difference between the worked penetration and the unworked penetration is likely to become large, but the grease satisfying the above penetration conditions can be obtained by selecting a type of urea, mixing a plurality of types of urea, adjusting urea formation conditions, adjusting additives, and the like.

Since the unworked penetration of the grease 60 after standing at 85° C. for 18 hours is larger than 158, a degree of hardening of the grease 60 can be set to such an extent that the base oil seeps out smoothly, even when the grease 60 is exposed to a high temperature or left to stand for a long time. Therefore, the rolling bearing 1 having high durability can be formed.

The grease 60 has the outer ring contact portion 61 which is in contact with the inner circumferential surface 22b of the protruding portion 22 of the outer ring 20, and the seal member contact portion 62 which is in contact with the flat surface portion 53 of the seal member 50 on the outside in the axial direction and on the inside in the radial direction relative to the outer ring contact portion 61. An area of the seal member contact portion 62 is larger than a contact area between the grease 60 and the extending portion 52 and the pedestal portion 51 of the seal member 50. According to this configuration, when the seal member 50 is mounted after the grease 60 is applied to a predetermined location, it is possible to provide a room for the grease 60 which is pressed inward in the axial direction by the flat surface portion 53 of the seal member 50 to spread in the radial direction toward the extending portion 52 and the pedestal portion 51. Therefore, it is possible to prevent the grease 60 from greatly spreading to an inner ring 10 side and a rolling element 30 side. Therefore, it is possible to easily prevent the grease 60 from coming into direct contact with the rolling element 30 and the retainer 40.

Further, since the seal member 50 is provided with the extending portion 52 between the flat surface portion 53 and the pedestal portion 51, as compared with a configuration in which a flat surface portion extends inward in a radial direction from a pedestal portion, the grease 60 can be disposed at a position further separated from the rolling element 30. Therefore, an amount of the grease 60 can be increased.

As described above, it is possible to provide the rolling bearing 1 which can both ensure the durability and reduce the rotational resistance.

The seal member contact portion 62 includes a center position of the grease 60 in the radial direction in the plan view. According to this configuration, when the seal member 50 is mounted, the grease 60 spreads in the radial direction by being pressed by the flat surface portion 53. As a result, since the seal member contact portion 62 includes the center position of the grease 60 in the radial direction in the plan view, it is possible to prevent the grease 60 from greatly spreading inward in the axial direction toward the rolling element 30. Therefore, it is possible to easily prevent the grease 60 from coming into direct contact with the rolling element 30.

The grease 60 is not in contact with the extending portion 52. According to this configuration, when the seal member 50 is mounted, it is possible to provide a larger room for the grease 60 which is pressed inward in the axial direction by the flat surface portion 53 of the seal member 50 to spread in the radial direction toward the extending portion 52. Therefore, it is possible to prevent the grease 60 from greatly spreading to the inner ring 10 side and the rolling element 30 side. Therefore, it is possible to easily prevent the grease 60 from coming into contact with the rolling element 30, the retainer 40, and the inner ring 10 more than necessary.

The outer ring contact portion 61 is provided at an interval in the axial direction from the contact portion between the outer ring 20 and the pedestal portion 51. According to this configuration, it is possible to prevent the grease 60 from coming into contact with the contact portion between the outer ring 20 and the pedestal portion 51. Accordingly, it is possible to prevent the grease 60 from leaking to an outside of the seal member 50 due to a capillary phenomenon through the contact portion between the outer ring 20 and the pedestal portion 51.

The grease 60 is not in contact with the pedestal portion 51. According to this configuration, it is possible to prevent the grease 60 from coming into contact with the contact portion between the outer ring 20 and the pedestal portion 51. Accordingly, it is possible to prevent the grease 60 from leaking to an outside of the seal member 50 due to the capillary phenomenon through the contact portion between the outer ring 20 and the pedestal portion 51.

According to the rotation device 2 of the present embodiment, a long life of the rotation device 2 can be achieved by including the rolling bearing 1 having excellent long-term durability.

In the first embodiment, the pedestal portion 51 of the seal member 50 protrudes inward in the radial direction from the end surface 22a of the protruding portion 22 of the outer ring 20 in the plan view, but it is desirable that the pedestal portion does not protrude inward in the radial direction relative to the end surface 22a of the protruding portion 22 in the plan view. According to this configuration, even when the outer ring contact portion 61 of the grease 60 spreads outward in the axial direction and climbs over the inner circumferential edge of the end surface 22a, it is possible to prevent the grease 60 from adhering to the pedestal portion. Therefore, it is possible to prevent the grease 60 from coming into contact with the contact portion between the outer ring 20 and the pedestal portion. Accordingly, it is possible to prevent the grease 60 from leaking to the outside of the seal member due to the capillary phenomenon through the contact portion between the outer ring 20 and the pedestal portion.

In the first embodiment, the grease 60 is not in contact with the pedestal portion 51 and the extending portion 52 of the seal member 50, but the invention is not limited to the configuration. The grease may be in contact with at least one of the pedestal portion 51 and the extending portion 52 of the seal member 50. Here, the pedestal portion 51 and the extending portion 52 are positioned inward of the flat surface portion 53 in the axial direction, and are positioned closer to the rolling element 30 and the retainer 40 than the flat surface portion 53. Therefore, when the seal member 50 is mounted, the grease 60 is pushed toward the rolling element 30 and retainer 40 side, and is easily brought into contact with the rolling element 30 or the retainer 40. In the present embodiment, it is possible to prevent the grease 60 from coming into contact with the rolling element 30 or the retainer 40 more than necessary by preventing the grease 60 from moving inward in the axial direction. Therefore, the grease 60 of the present embodiment can be suitably used. When the grease 60 is in contact with at least one of the pedestal portion 51 and the extending portion 52 of the seal member 50, the area of the seal member contact portion is preferably larger than the contact area of the grease with the extending portion 52 and the pedestal portion 51.

Second Embodiment

Figure 5:
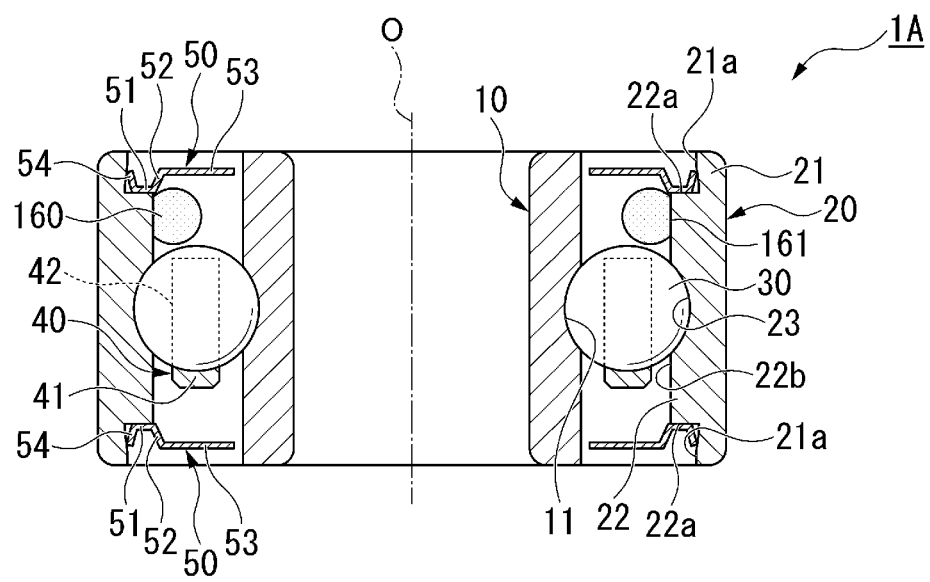
FIG. 5 is a longitudinal cross-sectional view of a rolling bearing according to a second embodiment.

Next, a second embodiment will be described with reference to FIG. 5. The second embodiment is different from the first embodiment in that a rolling bearing 1A includes grease 160 instead of the grease 60 of the first embodiment. Structures other than those described below are the similar as those of the first embodiment.

The grease 160 is disposed along the circumferential direction. The grease 160 extends in a circular ring shape and is disposed coaxially with the common axis O. The grease 160 includes an outer ring contact portion 161 which is in contact with the inner circumferential surface 22b of the protruding portion 22 of the outer ring 20, and is not in contact with the inner ring 10, the seal member 50, the rolling element 30, and the retainer 40. The outer ring contact portion 161 extends in the circumferential direction over an entire length of the grease 160. The outer ring contact portion 161 has a width in the axial direction over the entire circumferential direction. The outer ring contact portion 161 is in contact with a location of the inner circumferential surface 22b of the protruding portion 22 at an interval from the outer ring raceway surface 23 in the axial direction. The outer ring contact portion 161 is in contact with a location of the inner circumferential surface 22b of the protruding portion 22 at an interval from the inner circumferential edge of the end surface 22a on the upper side in the axial direction. That is, the outer ring contact portion 161 is provided at an interval in the axial direction from the contact portion between the outer ring 20 and the pedestal portion 51 of the seal member 50.

Properties of the grease 160 are similar as those of the grease 60 of the first embodiment. That is, unworked penetration of the grease 160 is more than 178 and less than 287. A difference between worked penetration and the unworked penetration of the grease 160 is preferably less than 50. A ratio of the difference between the worked penetration and the unworked penetration to the worked penetration of the grease 160 is preferably less than 22.7%.

In the present embodiment, the same effects as those of the first embodiment are achieved. In addition, in the present embodiment, since the grease 160 is not in contact with the seal member 50, the grease 160 is not pressed by the seal member 50 when the seal member 50 is mounted on the outer ring 20. Accordingly, it is possible to prevent the grease 160 from moving inward in the axial direction and to prevent the grease 160 from coming into contact with the rolling element 30 or the retainer 40 more than necessary. Therefore, an increase in rotational resistance of the rolling bearing 1A can be prevented.

In the second embodiment, the grease 160 extends in a circular ring shape, but the invention is not limited to the configuration. The grease may extend in an arc shape so as to form an intermittent portion, or may include a plurality of particles arranged in dots over an entire circumference. When the grease has a plurality of particles, the plurality of particles aligned in the circumferential direction may be integrated or separated from each other.

Third Embodiment

Figure 6:
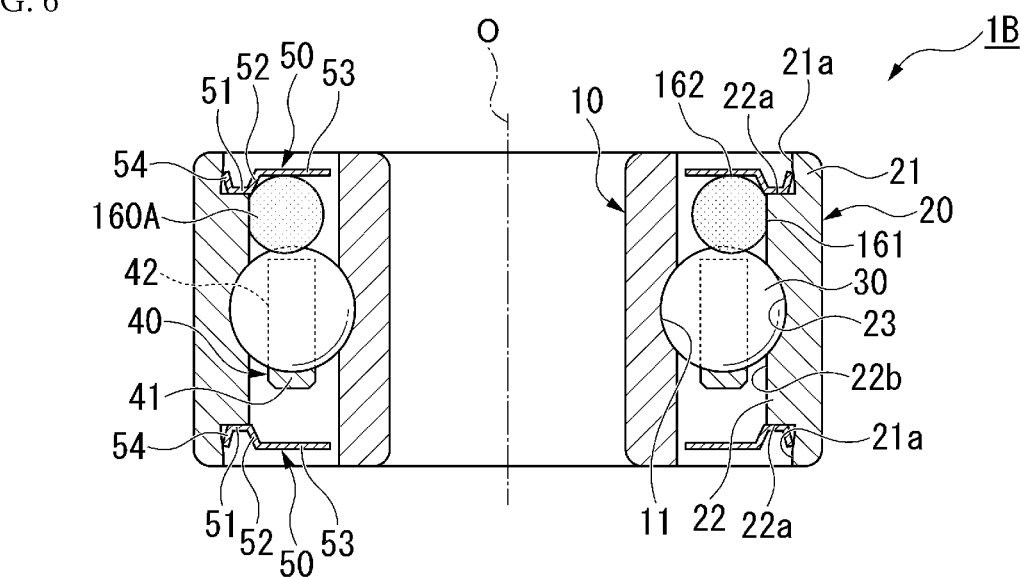
FIG. 6 is a longitudinal cross-sectional view of a rolling bearing according to a third embodiment.

Next, a third embodiment will be described with reference to FIG. 6. A rolling bearing 1B of the third embodiment is different from the rolling bearing 1A of the second embodiment in that grease 160A is in contact with the seal member 50 and the rolling element 30. Structures other than those described below are the similar as those of the second embodiment.

The grease 160A further includes a seal member contact portion 162 which is in contact with the flat surface portion 53 of the seal member 50 on the outside in the axial direction and on the inside in the radial direction relative to the outer ring contact portion 161, and is not in contact with the inner ring 10. The seal member contact portion 162 is in contact with only the flat surface portion 53 of the seal member 50. Accordingly, the grease 160A is not in contact with the pedestal portion 51 and the extending portion 52 of the seal member 50, which are positioned closer to the outer ring 20 side than the flat surface portion 53 of the seal member 50. The grease 160A is in contact with the rolling element 30. A volume of a portion of the grease 160A in contact with the rolling element 30 is half or less of a volume of the entire grease 160A. The grease 160A may be in contact with the retainer 40.

Properties of the grease 160A are similar as those of the grease 60 of the first embodiment. That is, unworked penetration of the grease 160A is more than 178 and less than 287. A difference between worked penetration and the unworked penetration of the grease 160A is preferably less than 50. A ratio of the difference between the worked penetration and the unworked penetration to the worked penetration of the grease 160A is preferably less than 22.7%.

In the present embodiment, the same effects as those of the second embodiment are achieved. In addition, in the present embodiment, since the grease 160A is in contact with the rolling element 30, a base oil of the grease 160A can be directly supplied to the rolling element 30. Therefore, an increase in rotational resistance of the rolling bearing 1B can be prevented.

In the third embodiment, the grease 160A extends in a circular ring shape, but the invention is not limited to this configuration. The grease may extend in an arc shape so as to form an intermittent portion, or may include a plurality of particles arranged in dots over an entire circumference. When the grease has a plurality of particles, the plurality of particles aligned in the circumferential direction may be integrated or separated from each other.

EXAMPLES

Hereinafter, the invention will be described in detail with reference to examples, but the invention is not limited to the following description.

Viscosity of grease in the present example was measured at 40° C. in accordance with JIS K2283. Penetration of the grease in the present example was measured by a method defined in JIS K2220.

Grease in Examples 1 to 5 and Comparative Examples 1 to 4 was prepared as follows.

Example 1

An ester oil and a PAO were mixed at a mass ratio (ester oil/PAO)>1 to obtain a base oil having kinematic viscosity of 44 mm$^2$/s. Alicyclic urea was synthesized in this base oil as a thickener to obtain grease having worked penetration of 228, unworked penetration of 227, and unworked penetration of 188 after standing at a high temperature.

Example 2

The same base oil and thickener as in Example 1 were used, and a ratio of the thickener to the base oil was adjusted to obtain grease having worked penetration of 261, unworked penetration of 255, and unworked penetration of 210 after standing at a high temperature.

Example 3

An ether oil and an ester oil were mixed at a mass ratio (ether oil/ester oil)>1 to obtain a base oil having kinematic viscosity of 80 mm$^2$/s. Alicyclic urea was synthesized in this base oil to obtain grease having worked penetration of 290, unworked penetration of 274, and unworked penetration of 282 after standing at a high temperature.

Example 4

A PAO alone was used as a base oil having kinematic viscosity of 48 mm$^2$/s. Alicyclic urea and aliphatic urea were synthesized in this base oil to obtain grease having worked penetration of 199, unworked penetration of 197, and unworked penetration of 200 after standing at a high temperature.

Example 5

An ester oil alone was used as a base oil having kinematic viscosity of 100 mm$^2$/s. Alicyclic urea and aliphatic urea were synthesized in this base oil to obtain grease having worked penetration of 265, unworked penetration of 245, and unworked penetration of 244 after standing at a high temperature.

Comparative Example 1

A PAO alone was used as a base oil having kinematic viscosity of 48 mm$^2$/s. Alicyclic urea and aliphatic urea were synthesized in this base oil as a thickener to obtain grease having worked penetration of 220, unworked penetration of 170, and unworked penetration of 158 after standing at a high temperature.

Comparative Example 2

A PAO and an ester oil were mixed at a mass ratio (PAO/ester oil)>1 to obtain a base oil having kinematic viscosity of 22 mm$^2$/s. Alicyclic urea and aliphatic urea were synthesized in this base oil as a thickener to obtain grease having worked penetration of 232, unworked penetration of 178, and unworked penetration of 149 after standing at a high temperature.

Comparative Example 3

The same base oil and thickener as in Example 1 were used, and a ratio of the thickener to the base oil was adjusted to obtain grease having worked penetration of 295, unworked penetration of 287, and unworked penetration of 236 after standing at a high temperature.

Comparative Example 4

A mineral oil and a PAO were mixed at a mass ratio (mineral oil/PAO)≈1 to obtain a base oil having kinematic viscosity of 52 mm$^2$/s. Alicyclic urea and aliphatic urea were synthesized in this base oil as a thickener to obtain grease having worked penetration of 248, unworked penetration of 164, and unworked penetration of 155 after standing at a high temperature.

With respect to the grease in Examples 1 to 5 and in Comparative Examples 1, 2, and 4, a durability test for the rolling bearing was performed under the following conditions. When the grease in Comparative Example 3 was used in the following rolling bearing, a variation in rotational resistance of each rolling bearing was larger than a predetermined required value, and a fluctuation in the rotational resistance with respect to an operating time occurred, so that the grease was determined to be unsuitable for a rolling bearing, and was excluded from a target of the durability test.

Shape of Rolling Bearing

A rolling bearing having an outer ring with an outer diameter of 8 mm, an inner ring with an inner diameter of 3 mm, and a height (thickness in the axial direction) of 4 mm was used.

Arrangement of Grease

Grease of 12 mg was applied to a shape of the grease 60 of the first embodiment.

Method for Evaluating Durability

Two rolling bearings using the same grease were incorporated into one fan motor (rated rotation speed 25000 rpm). For the grease in Examples 1 to 3 and in Comparative Examples 1 and 2, five fan motors were prepared, and continuously operated in a high temperature tank at 85° C. to check an operating state and occurrence of abnormal noise every 500 hours.

Evaluation results are shown in Table 1:

TABLE 1

| | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|
| Thickener | Urea | Urea | Urea | Urea | Urea | Urea | Urea | Urea | Urea |
| Base oil | PAO | PAO/ester | Ester/PAO | Mineral oil/PAO | Ester/ PAO | Ester/ PAO | Ether oil/ ester | PAO | Ester |

TABLE 1-continued

| | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|
| Kinematic viscosity of base oil (40° C.) | 48 | 22 | 44 | 52 | 44 | 44 | 80 | 48 | 100 |
| Worked penetration | 220 | 232 | 295 | 248 | 228 | 261 | 290 | 199 | 265 |
| Unworked penetration | 170 | 178 | 287 | 164 | 227 | 255 | 274 | 197 | 245 |
| Worked penetration – unworked penetration | 50 | 54 | 8 | 84 | 1 | 6 | 16 | 2 | 20 |
| (Worked penetration – unworked penetration)/worked penetration (%) | 22.7 | 23.3 | 2.7 | 33.9 | 0.4 | 2.3 | 5.5 | 1 | 7.5 |
| Unworked penetration after standing at 85° C. for 18 hours | 158 | 149 | 236 | 155 | 188 | 210 | 282 | 200 | 244 |
| Evaluation result | Low durability Occurrence of abnormal noise | Low durability Stop | Variation in rotational resistance is large Fluctuation in the rotational resistance is large | | | | | | |

When the grease in Comparative Example 1 was used, occurrence of abnormal noise was confirmed in three of the five fan motors in an operating time of 3000 hours. When the grease in Comparative Example 2 was used, one of the five fan motors stopped at an operating time of 2000 hours, and two more stopped at an operating time of 2500 hours. On the other hand, when the grease in each of Examples 1 to 3 was used, the five fan motors were stably operated without occurrence of abnormal noise even after an operating time of 5000 hours. From the above description, it is clear that, when the unworked penetration of the grease is more than 178 and less than 287, it is possible to improve durability of the rolling bearing while preventing occurrence of variations in the rotational resistance of each rolling bearing. Further, it is clear that the durability of the rolling bearing can be reliably improved if a difference between the worked penetration and the unworked penetration is less than 50 while the unworked penetration of the grease satisfies the above conditions. It is clear that the durability of the rolling bearing can be reliably improved when the ratio of the difference between the worked penetration and the unworked penetration to the worked penetration is less than 22.7% while the unworked penetration of the grease satisfies the above conditions.

The invention is not limited to the embodiments described above with reference to the drawings, and various modifications are conceivable within a technical scope thereof.

For example, in the above embodiments, the inner ring 10 is provided as a rotation ring, and the outer ring 20 is provided as a fixed ring. The grease 60, the grease 160, and the grease 160A are in contact with the outer ring 20 which is the fixed ring. However, a bearing ring with which grease is in contact may not be a fixed ring. That is, the inner ring may be provided as a fixed ring, the outer ring may be provided as a rotation ring, and the grease may be in contact with the inner ring which is the fixed ring. In addition, the inner ring may be provided as a fixed ring, the outer ring may be provided as a rotation ring, and the grease may be in contact with the outer ring which is the rotation ring. Although the rolling element 30 is held by the retainer 40 in the above embodiment, the invention may be applied to a rolling bearing having no retainer.

In the above embodiments and the modifications thereof, the grease is disposed along the circumferential direction by substantially one turn, but the invention is not limited to this configuration. The grease may include a first annular portion which is in contact with the outer ring 20, and a second annular portion which is continuous with the first annular portion and which is in contact with the seal member 50. In this case, the first annular portion and the second annular portion extend in a circular ring shape around the common axis O. At least either one of the first annular portion and the second annular portion may extend around the common axis O by less than 360°. At least either one of the first annular portion and the second annular portion may contain a plurality of particles arranged in dots over an entire circumference.

Figure 7:
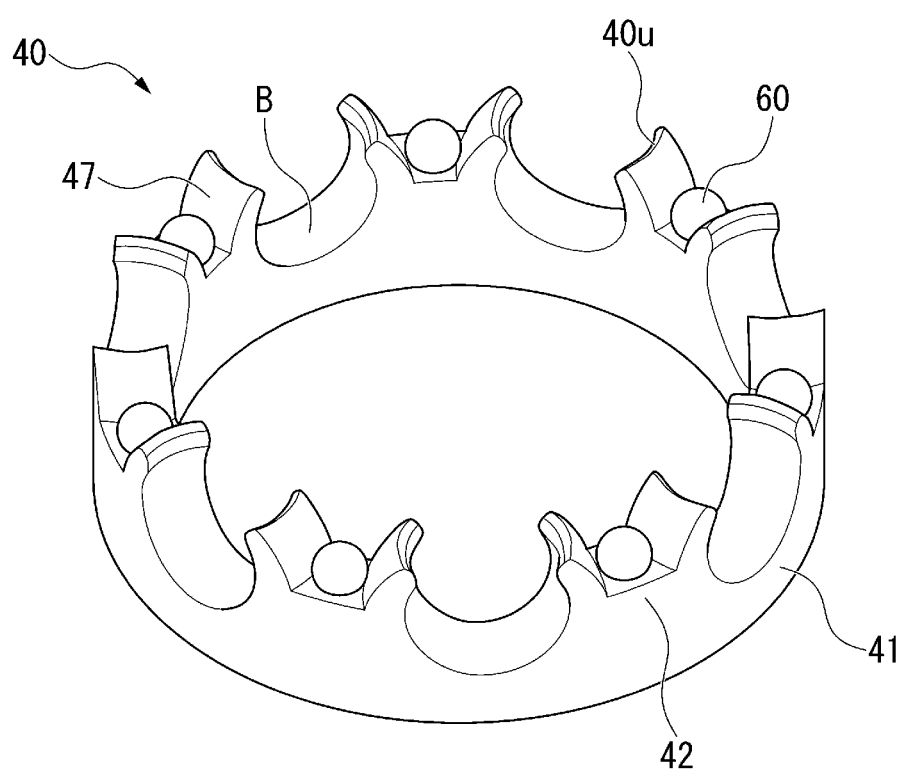
FIG. 7 is a perspective view showing a retainer in which the grease is disposed.

In addition to the grease 60, 160, and 160A, or instead of the grease 60, 160, and 160A, the rolling bearing may have grease disposed in a grease pocket, a lower end surface, or the like of the retainer. In this case, it is desirable that the grease disposed in the retainer does not contact the rolling element. FIG. 7 shows an example in which the grease 60 is disposed in the retainer 40. As shown in FIG. 7, the retainer 40 includes the annular portion 41 and a plurality of column portions 42. Further, grease pockets 47 recessed downward are formed in an upper end surface 40u of the retainer 40. Each of the grease pockets 47 is formed between a pair of ball pockets B adjacent to each other in the circumferential direction. That is, the grease pocket 47 is formed in each column portion 42. The grease 60 is disposed in the grease pocket 47. The grease may be disposed on a lower end surface of the retainer 40 in addition to the grease pocket 47 or instead of the grease pocket 47. When the grease is disposed in the retainer 40, the grease disposed in the retainer 40 is disposed separately from the grease applied so as to be in contact with the bearing ring and the seal member. That is, the grease disposed in the retainer 40 does not come into contact with the bearing ring and the seal member.

In the above embodiments, the grease 60, the grease 160, and the grease 160A are in contact with the inner circumferential surface of the outer ring 20, but the invention is not limited to this configuration. The grease may be in contact with only the seal member 50 without being in contact with the bearing ring. That is, the grease may be in contact with at least one of a circumferential surface (inner circumferential surface or outer circumferential surface) of one bearing ring facing the other bearing ring and the seal member 50.

In the above embodiments, the fan motor is shown as the rotation device, but the rotation device is not limited thereto. For example, the invention may be applied to a dental handpiece, a spindle motor of a hard disk drive, and the like as the rotation device. In particular, in a rolling bearing applied to the spindle motor of the hard disk drive, a low torque is required, a rotation angle is less than 360°, and a configuration in which grease is disposed in a retainer is suitable, so that the grease of the invention in which the base oil easily seeps out without being subjected to shearing is useful.

The invention does not limit a size of the rolling bearing. The size of the rolling bearing used in the durability test in the above Examples is an example of a small bearing (outer diameter of 30 mm or less) used in a small motor in which a torque of the motor is small and which is easily affected by a bearing torque due to grease, and the invention has a great advantage, particularly for a rolling bearing having an outer diameter of 16 mm or less.

In addition, it is possible to appropriately replace components in the above embodiments with well-known components without departing from the gist of the invention, and each embodiment and each modification mentioned above may be appropriately combined.

What is claimed is:

1. A rolling bearing comprising:
a first ring and a second ring disposed coaxially with each other, wherein the first and second rings form an inner ring and an outer ring of the rolling bearing, respectively;
a rolling element disposed between the first ring and the second ring;
a seal member mounted on the second ring and configured to isolate a space between the first ring and the second ring from an outside in an axial direction, wherein the seal member comprises:
an annular pedestal portion being in contact with the second ring,
an extending portion extending radially and outwardly in the axial direction from a circumferential edge of the pedestal portion, and
a flat surface portion extending radially from an end edge of the extending portion toward the first ring; and
grease that is disposed between the rolling element and the seal member, the grease being in contact with the second ring but not in contact with the first ring, and the grease being in contact with the flat surface portion of the seal member but not in contact with the extending portion of the seal member, and
wherein unworked penetration of the grease is more than 178 and less than 287.

2. The rolling bearing according to claim 1, wherein a difference between worked penetration and the unworked penetration of the grease is less than 50.

3. The rolling bearing according to claim 1, wherein a ratio of a difference between worked penetration and the unworked penetration of the grease, relative to the worked penetration of the grease is less than 22.7%.

4. The rolling bearing according to claim 1, wherein a thickener of the grease contains urea.

5. The rolling bearing according to claim 1, wherein the unworked penetration of the grease after standing at 85° C. for 18 hours is more than 158.

6. The rolling bearing according to claim 1, wherein the grease is disposed obliquely between the second ring and the flat surface portion of the seal member.

7. The rolling bearing according to claim 6, wherein a contact area over which the grease is in contact with the flat surface portion of the seal member includes center line running between the first and second rings.

8. The rolling bearing according to claim 6, wherein the grease is in contact with the second ring at a location spatially separated in the axial direction from the annular pedestal portion being in contact with the second ring.

9. The rolling bearing according to claim 6, wherein the grease is not in contact with the annular pedestal portion.

10. The rolling bearing according to claim 6, wherein
the second ring comprises a protruding portion that protrudes toward the first ring, wherein a raceway surface is formed in the protruding portion,
the protruding portion comprises an end surface that faces the outside in the axial direction, and which is in contact with the annular pedestal portion, and
the annular pedestal portion is configured not to extend toward the first ring radially beyond the end surface when viewed from the axial direction.

11. A rotation device comprising:
a rotation body that is rotatably disposed;
a support body that rotatably supports the rotation body; and
the rolling bearing according to claim 1, which is interposed between the rotation body and the support body.

12. A rolling bearing comprising:
a first ring and a second ring disposed coaxially with each other, wherein the first and second rings form an inner ring and an outer ring of the rolling bearing, respectively;
a rolling element disposed between the first ring and the second ring;
a seal member mounted on the first ring and configured to isolate a space between the first ring and the second ring from an outside in an axial direction, wherein the seal member comprises:
an annular pedestal portion being in contact with the first ring, an extending portion extending radially and outwardly in the axial direction from a circumferential edge of the pedestal portion, and
a flat surface portion extending radially from an end edge of the extending portion toward the second ring; and
grease that is disposed between the rolling element and the seal member, the grease being in contact with the first ring but not in contact with the second ring, and the grease being in contact with the flat surface portion of the seal member but not in contact with the extending portion of the seal member, and
wherein unworked penetration of the grease is more than 178 and less than 287.

* * * * *